3,021,209
RECOVERY OF METALS
Maurice J. Murray, Palatine, and Edward J. Bicek, La Grange, Ill., assignors to Universal Oil Products Company, Des Plaines, Ill., a corporation of Delaware
No Drawing. Filed Dec. 8, 1959, Ser. No. 858,049
14 Claims. (Cl. 75—83)

The present application is a continuation-in-part of our co-pending application Serial No. 562,012, filed January 30, 1956, now abandoned. The present invention relates to processes for the recovery of metals; more specifically, the present invention provides a method for the recovery of platinum and palladium from a composite in which these noble metals are associated intimately with a metal oxide. The method of the present invention affords particular advantages to the removal of platinum from a platinum-containing catalytic composite which has become deactivated following an extended period of use.

Many methods have been devised to recover noble metals from catalytic composites; most of these methods are unsatisfactory, in the economic sense, because of their comparatively high expense and extreme complexity. Present methods generally require that the carrying medium, that is, the refractory metal oxide employed as the carrier material, in combination with the noble metal, be dissolved with the result that a slurry of finely divided solid material remains. The slurry of solid material comprises the catalytically active noble metal, desired to be recovered, and all other materials which are insoluble in the solvent or dissolving medium. The main difficulties with these more common methods are that they require the digestion or dissolution of exceedingly large quantities of the carrier material in order to recover extremely small quantities of the relatively expensive noble metal; the material recovered, following such digestion, generally is not the pure metal, or pure metal compound, and requires further substantial purification. Other prior practices for the recovery of metals have included the use of strong acids to dissolve the metal followed by recovery of the metal from its acid solution. When the metal is a noble metal, aqua regia has been used for this purpose; this particular method has, however, the inherent disadvantage that the metal oxide, with which the noble metal is associated, is also dissolved in significant quantities, thereby necessitating further processing for the purpose of purification.

The process of the present invention involves a method of treating the noble metal-containing composite in such a manner as to convert the noble metal contained thereinto a volatilizable form, whereby there is effected a comparatively rapid separation of the noble metal from the metal oxide carrying medium. One inherent advantage to this method is that the separation of the noble metal from the metal oxide does not substantially destroy the physical and/or chemical characteristics of the metal oxide carrier material. Although the method of the present invention is specifically directed to the recovery of noble metals, particularly platinum and palladium, from used or deactivated catalytic composites, the method is equally successful in recovering noble metals from other types of particles containing the same. For example many naturally-occurring ores, clays and earths contain minute quantities of noble and precious metals such as gold, ruthenium, rhenium, rhodium, in addition to platinum and palladium, which could not be recovered economically therefrom through the use of the more common methods hereinabove described. The method of the present invention, however, results in a process for the recovery of such metals in a manner which is economically feasible.

The primary object of the present invention is to provide a process which may be successfully employed to recover noble and precious metals from a variety of particles containing the same in comparatively minor quantities. A more specific object of the present invention is to permit the recovery of catalytically active noble metals from the catalytic composite containing the same, whereby the carrier material is substantially unaffected, and may be reused in the manufacture of other catalytic composites. In its broad aspect, the present invention relates to a method for removing a noble metal from a composite containing said noble metal which comprises treating said composite with an oxide of nitrogen at a temperature sufficient to convert the noble metal to a volatilizable form.

One embodiment relates to a method of removing a noble metal from a composite containing said noble metal, which method comprises treating said composite with an oxide of nitrogen and a volatilizable inorganic chlorine-containing compound at an elevated temperature sufficient to convert the noble metal to a volatilizable form.

In another embodiment, the present invention is directed to a method for removing a noble metal from noble metal-containing particles, which method comprises treating said noble metal-containing particles with an oxide of nitrogen and aluminum chloride at a temperature sufficient to convert the noble metal into a volatilizable form.

In still another embodiment, the present invention affords a method of recovering a noble metal from a noble metal-containing composite, which method comprises treating said composite with an oxide of nitrogen and chlorine at a temperature sufficient to convert the noble metal to a volatilizable form, withdrawing vapors after contact with said composite, and recovering noble metal from said vapors.

More specifically, the present invention is directed toward a method for removing platinum from platinum-containing particles which comprises treating said platinum-containing particles with chlorine and an oxide of nitrogen at elevated temperatures sufficient to convert the platinum into a volatilizable form.

Noble metals find widespread utility for use as components of catalysts for the conversion of organic compounds, and particularly for the catalytic reforming of various hydrocarbons and mixtures of hydrocarbons. The noble metal generally exists in association with a metal oxide, and is usually in the form of particles of uniform size and shape. After extended use in a particular process, the catalyst loses its activity and becomes ineffective at serving the desired function. It is necessary to subject such spent catalyst to suitable treatment in order to restore the activity thereof. In one embodiment, the present invention offers a novel method of restoring the activity of used catalysts by treatment in the manner herein set forth to dissolve the platinum, that is to vaporize the platinum, without dissolving or vaporizing the metal oxide to a substantial extent. The metal oxide may then be re-impregnated with additional quantities of platinum.

The noble metals which may be recovered in accordance with the present invention include platinum, palladium, gold, silver, iridium, rhenium, rhodium, ruthenium, osmium, etc. As hereinbefore set forth, these noble metals are generally associated with a refractory metal oxide and particularly an oxide of a metal in the left-hand column of groups II to VIII of the periodic table, including particularly the oxides of aluminum, titanium, zirconium, hafnium, thorium, vanadium, tantalum, antimony, chromium, molybdenum, tungsten, uranium, manganese, cobalt, nickel, etc. It is understood that the catalyst may comprise one or more noble metals and one or more metal oxides. In still other cases, one or more activating components may be included in the catalyst. These activating components generally are acidic, and include halides, particularly chlorides and fluorides, other mineral acids, organic acids, etc., and, in many particular instances, silica is employed in combination with the metal oxides above set forth. The composite of noble metal or more metal oxides. In still other cases, one or more suitable for use as a catalyst for effecting reactions of organic compounds, and particularly hydrocarbons, including such reactions as dehydrogenation, hydrogenation, cyclization, isomerization, hydrocracking, reforming, oxidation, etc. These reactions are well known in the prior art and the miscellaneous operating conditions such as temperature, pressure, etc., are described in detail therein.

The novel features of the present invention are particularly adapted to the removal of platinum from an alumina-platinum catalyst, and specifically those alumina-platinum catalysts which recently have been found to be of particular advantage in the reforming of hydrocarbons. In the interest of simplicity, the following description will be directed primarily to the recovery of platinum from catalysts comprising alumina and platinum, with the understanding that the novel features of the invention may be applied to other noble metals and other catalyst compositions, as well as for the recovery of noble metals from various naturally-occurring ores, clays and earths, etc. For example, using the method of this invention, platinum may be stripped from composites such as alumina-platinum-combined halogen, alumina-platinum, alumina-silica-platinum, silica-platinum, etc.

Several methods have been proposed to remove platinum from various platinum-containing particles. One such method is to strip the platinum from the composite by treatment with aluminum chloride vapors at elevated temperatures. Another method is to strip the platinum from the composite by treatment with carbon monoxide-chlorine mixtures. In these methods, and others, a vapor stream is removed, the platinum appearing in this vapor stream. For example, an alumina-platinum composite may be treated by continuously passing aluminum chloride vapors over the composite in a confined zone. The effluent vapors are collected and the platinum recovered from these effluent vapors. In another method, the alumina-platinum composite may be mixed with solid aluminum chloride, the mixture placed in a confined heating zone and then heated to vaporize the aluminum chloride. The effluent gases from this zone will also contain platinum. In still another method, the alumina-platinum composite is treated with a reactant which reacts with the alumina carrier material to form aluminum chloride and it is these aluminum chloride vapors, formed in situ, which strip the platinum from the carrier material. For example, an alumina-platinum composite may have the platinum stripped therefrom by placing the composite in a confined stripping zone and passing phosphorus pentachloride vapors into contact with the composite. The phosphorus pentachloride reacts with the alumina to form aluminum chloride, the aluminum chloride vapors being the actual stripping medium. Therefore, when alumina is part of the composite, a volatile chlorine-containing substance reactable with the alumina, and capable of forming aluminum chloride thereby, may be used. In addition, chlorine gas may be employed in conjunction with powdered aluminum metal to form the aluminum chloride vapors. Similarly, it has been proposed to employ phosgene which reacts with the alumina carrier material to form aluminum chloride in situ. Carbon tetrachloride reacts in a like manner, and has also been proposed as a means for obtaining the aluminum chloride vapors. The exact method, whereby the aluminum chloride vapors remove the platinum from the platinum-containing composites is not definitely known. It appears that the aluminum chloride, either as $AlCl_3$ or $Al_2Cl_6$, enters into a chemical combination, or physical association, with one or more platinum compounds to form a volatile platinum compound, or complex, which is withdrawn with the effluent gases. When using carbon monoxide-chlorine mixtures as the stripping gas, it appears that the platinum is removed by converting it to a volatile carbonyl which is removed with the effluent gases.

In other methods, it has been proposed to remove the platinum from the platinum-containing composite by contacting the composite with a liquid reagent which will dissolve the platinum without dissolving the rest of the carrier material. For example, the platinum may be removed from a platinum-alumina catalyst by contacting the catalyst with aqua regia. The aqua regia attacks the platinum forming a soluble compound thereof, and the platinum thereby passes into the liquid phase. In another method, the platinum-alumina composite, is placed in a solution of hydrochloric acid to which hydrogen peroxide has been added: the platinum is dissolved in this solution. In still another method, the platinum-alumina catalyst is placed in a liquid mixture of chlorine and hydrochloric acid, whereby the platinum is dissolved.

In all these, and miscellaneous other methods of removing platinum from the platinum-containing composite, it has been found that there exists a residual amount of platinum which resists dissolution and/or volatilization. The amount of this residual platinum may vary from as much as 25% down to about 5% by weight of the amount of platinum originally present. The exact reason why this residual platinum is so highly unreactive has not been definitely ascertained; the residual platinum may actually be metallic platinum, which is highly inert; it may be platinum present as an unreactive compound; or, the platinum may be physically associated with one or more of the other components of the composite in such a manner that the platinum is rendered unreactive. Whatever the reason for this residual platinum to be so highly unreactive, we have discovered that treatment of the platinum-containing composite with an oxide of nitrogen before, during, and/or after contact with the stripping or dissolving medium activates the residual platinum so that it is rendered more active, or more readily subject to volatilization. By contacting the composite with an oxide of nitrogen and subsequently contacting the composite with a stripping gas or dissolving liquid medium, we have found that the platinum may be removed from the composite to an extent greater than heretofore was possible. For example, it is very difficult to remove the last 1% of the platinum from a platinum-alumina catalyst. This last 1% of the original amount of platinum is highly unreactive and is not readily stripped from the catalyst by reaction with chlorine or aluminum chloride vapors as has hereinbefore been described. If the composite containing this residual amount of platinum is treated with an oxide of nitrogen, the residual platinum is converted to an active form which is more easily volatilized, and further treatment with aluminum chloride vapors will remove substantially all of the residual platinum.

Likewise, when the platinum is to be removed from the composite by contact with aqua regia, a residual amount of platinum remains associated with the composite and this residual platinum is unreactive even to aqua regia. However, we have discovered that if the composite is first treated with an oxide of nitrogen and then contacted with aqua regia, that the platinum left in the remaining composite is considerably reduced, that is, more of the platinum has been digested in the aqua regia.

The present invention, therefore, improves processes in which a noble metal is to be removed from a composite containing the same by making the platinum more reactive. According to the method of the present invention, the composite is treated with an oxide of nitrogen in order to convert the unreactive platinum to a more volatilizable form: this essential treatment forms the basis of our invention. Whether the noble metal is to be removed by treatment with aluminum chloride vapors, carbon tetrachloride, a carbon monoxide-chlorine mixture, phosgene, aqua regia, a hydrochloric acid-chlorine mixture, a hydrochloric acid-peroxide mixture, etc., or by treatment with other suitable reagents such as gaseous chlorine, we have discovered that when the noble metal containing composite is treated with an oxide of nitrogen, it is rendered more reactive, the rate of reaction is therefore higher, and the amount of noble metal which may be recovered from the composite is greater.

The platinum-containing composite may be treated with an oxide of nitrogen before contact with the reagent which will react with the platinum thereby removing the platinum from the composite. For example, an alumina-platinum composite may first be treated with an oxide of nitrogen and then with aluminum chloride vapors. The treatment with an oxide of nitrogen may also be at the same time as the contact with the reagent. For example, nitric oxide may be mixed with aluminum chloride vapors and the mixture passed through a stripping zone in which an alumina-platinum composite is situated. In still another mode of operation, the initial contact may be with the reagent which will react with the platinum to remove a greater portion of the platinum from the composite, followed by a treatment with nitric oxide and chlorine, in turn followed by another treatment with the reacting agent to remove the residual platinum remaining from the initial treatment. For example, an alumina-platinum composite in a stripping zone may have most of the platinum removed therefrom by treatment with aluminum chloride vapors. The partially stripped composite is then contacted with chlorine and an oxide of nitrogen, followed by further treatment with aluminum chloride vapors. In such procedures, the initial contact with the reagent, which reacts with the platinum to remove the platinum from the composite, may be to such an extent that only the residual, unreactive platinum is left on the composite. In accordance with one embodiment of our invention the composite containing the residual platinum is treated with an oxide of nitrogen and is treated with aluminum chloride vapors, and most of the residual platinum is thereby removed from the composite.

The platinum-containing composite may be treated with an oxide of nitrogen and an inorganic volatilizable chlorine-containing compound, particularly aluminum chloride and gaseous chlorine. One of the efficient embodiments of the present invention entails the utilization of an oxide of nitrogen and gaseous chlorine. The particles, from which it is desired to recover the noble metal, especially platinum, are placed in a suitable chamber in the form of a stationary bed. Where the volatilizing medium is to pass therethrough in a downward flow, a bed of powdered aluminum particles is placed above the platinum-containing particles, and gaseous chlorine passed therethrough at elevated temperatures. Aluminum chloride vapors are formed which remove the greater portion of platinum, leaving only that which, as hereinbefore described, is most highly unreactive. The particular oxide of nitrogen is then passed through the platinum-containing particles whereby the residual platinum is converted, or transformed, into a volatilizable state. Aluminum chloride vapors, formed by the reaction of chlorine and the alumina, are then employed the second time, whereby the residual platinum is volatilized from the composite. An additional feature of the present invention is that the oxide of nitrogen may be recycled for future use in regard to other individual batches of the platinum-containing particles. In another embodiment, the particles may first be contacted with aluminum chloride vapors to remove the greater portion of the platinum, and thereafter contacted with a mixture of gaseous chlorine and an oxide of nitrogen. The residual, highly unreactive platinum is thereby converted to a more volatilizable form, and subsequently removed by a second treatment with volatile aluminum chloride.

The exact method whereby the oxide of nitrogen renders the inert form of the noble metal more active has not been definitely established. One theory is that the oxide of nitrogen is an effective oxidizing agent which converts the inactive noble metal to the more active noble metal oxide. Whatever the mechanism, the treatment with an oxide or nitrogen has a very beneficial effect.

The contact of the noble metal-containing composite, in accordance with our invention, is with an oxide of nitrogen. Nitric oxide, NO, is a particularly efficient oxide of nitrogen, however, $N_2O$, $NO_2$, $N_2O_3$, $N_2O_5$, etc., may be used, although not necessarily with equivalent results. The oxide of nitrogen may be used in the pure form, or two or more oxides of nitrogen may be employed. Further, the oxide or oxides of nitrogen may be diluted with other gases such as air, nitrogen, carbon dioxide, helium, etc. These diluent gases are usually inert, that is, they do not react with the noble metal-containing composite. When the oxide of nitrogen is mixed with a diluent gas, the concentration of the oxide of nitrogen is usually at least 1% by volume, however, it is preferred that it is at least 5% by volume.

The temperature of treatment with an oxide of nitrogen is generally about the same temperature as that during the period in which the composite is being treated with the reactant which reacts with the noble metal to remove it from the catalyst. It is preferred that the temperature of treatment be at least 100° F., and preferably at least 200° F., and within the range of about 200° F., to about 1600° F., or more. Temperatures above 1600° F., should be avoided since these high temperatures generally result in a change in the physical structure of the alumina.

The time of contact of the oxide of nitrogen with the noble metal-containing composite is for a time sufficient to convert a substantial amount of the unreactive noble metal to a more reactive form. Generally the time of contact or treatment is at least one minute; however, it is generally preferred that the treatment be at least five minutes. Periods greater than about six hours are generally not used since the inert form of noble metal is usually converted to a more reactive form in less time.

The pressure of the oxide of nitrogen may be any suitable pressure. The partial pressure of the oxide of nitrogen may be sub-atmospheric, especially when it is used with diluent gases. When a pure oxide of nitrogen is used, the pressure may be sub-atmospheric; however, atmospheric and super-atmospheric pressures generally are used. At the higher pressures, less time of contact may be used, and lower contact temperatures may be used. The upper pressure limit is measured only by limits in the process equipment; generally, pressures above 100 atmospheres are not particularly beneficial.

When aluminum chloride vapors are used as the stripping medium, the platinum-containing composite is contacted with the aluminum chloride vapors, and the gases are separated from the reactant mixture. The gases separated from the reactant mixture will contain aluminum chloride vapors as well as the volatile compound and/or complex of platinum.

The contact of the aluminum chloride vapors, or chlorine gas, is effected at an elevated temperature and generally at a temperature within the range of from about 200° F. to about 1600° F., and preferably from about 700° F. to about 1100° F. Pure aluminum chloride vapors may be used, or the vapors may be diluted with an inert carrier gas such as helium, nitrogen, carbon dioxide, etc. It is preferable that this carrier gas does not react with the non-noble metal support, or other non-noble metal material in the composite, however, reaction with the noble metal may be desirable. Hydrogen and hydrogen-containing gaseous compounds such as HCl, CH$_4$, etc., are not desirable stripping gases since they appear to react with the catalyst at stripping conditions. The contact is for a time sufficient to convert a substantial amount of the platinum in the composite to the volatile form. The exact time is of course dependent upon the temperature, reactant concentration, etc.

After contact, the gases are removed from the reactant mixture. The gases will contain the volatile platinum compound and/or complex and usually will contain large amounts of excess aluminum chloride and carrier or diluent gases if used. The gases may be collected by passing them through water to absorb them, thereby forming an aqueous solution of aluminum chloride and platinum compound, which compound is probably platinum chloride. It appears that the volatile complex or compound of platinum is not stable at lower temperatures and a platinum compound, probably platinum chloride, may be deposited by contacting the effluent gas stream with a cool surface, that is a surface below about 200° F. The compound or complex also appears to dissociate when contacted with water, and there are indications that, when the effluent vapors are collected in water, all the water contains platinum chloride. While water is a particularly suitable scrubbing medium, other solutions such as a concentrated aluminum chloride water solution, a water solution of AlCl$_3$ and HCl, etc., may be used to form a solution of platinum compound. The platinum may be recovered as the metal from this solution by any of the well known methods, such as adding aluminum metal to the solution to reduce the platinum, thereby precipitating platinum metal, or hydrazine hydrate may be used as the reducing agent.

The following example is introduced to further illustrate the invention, however, it is not introduced to unduly limit the same in excess of the spirit and scope of the appended claims.

*Example*

The apparatus employed in the following series of platinum volatilization tests was of a bench-scale size, and consisted of a 33 mm. O.D. Pyrex glass tube, approximately 30 inches in length, which tube was mounted vertically and substantially completely surrounded by ceramic, electric-type heaters. The main heater was a vertically mounted, 12-inch split-type furnace, hinged to facilitate opening to permit visual inspection and observation of the contents within the glass tube. In ascending order, the contents of the tube were a bottom bed of a commercially-used, platinum-containing catalyst in an amount of 25 cc., a pad of glass wool approximately ½-inch thick, a top bed of the same platinum-containing catalyst in an amount of 25 cc., a second pad of glass wool about ½-inch thick and about 25 cc. of ⅛-inch cylindrical alumina pills. As the testing sequence dictated, from time to time small quantities of powdered aluminum chloride were placed into the top of the glass tube, and immediately above the ⅛-inch cylindrical alumina pills. This layer of aluminum chloride powder, and about the top 2 or 3 inches of the cylindrical alumina pills, were enclosed by a 5-inch auxiliary ceramic-type heater employed as a preheater for the purpose of volatilizing the aluminum chloride. The various gaseous media, employed as the volatilizing agents, were introduced in the top of the Pyrex glass tube, and flowed in a downward direction through the two beds of the platinum-containing catalyst.

The catalyst employed was substantially free from coke and other carbonaceous material as a result of a high temperature, air-oxidation procedure which had previously been effected for the purpose of removing these contaminating materials. Following the air-oxidation to remove the coke and carbonaceous material, the catalyst was analyzed and found to contain 0.37% by weight of platinum, calculated as the element. In addition to the platinum, the catalyst contained approximately 0.40% by weight of fluorine and chlorine, combined with the other components of the catalyst, the remainder thereof being alumina.

While utilizing the powdered aluminum chloride at the top of the glass tube, a stream of nitrogen was passed therethrough at a rate of 500 cc. per minute, and through the aluminum chloride which had been heated to a temperature of 400° F. The gaseous mixture was passed through the tube, carrying the aluminum chloride vapors through the catalyst and into contact therewith. During this operation, the two catalyst beds were maintained at a temperature of about 482° F. The catalyst, exhibiting a uniform gray color, was subsequently analyzed and found to contain platinum in an amount of 0.074% by weight. Subsequent treatments with additional aluminum chloride vapors failed to decrease the quantity of residual platinum, and did not effect an appreciable change in the color of the catalyst.

The two beds of catalyst were then contacted with a gaseous mixture comprising 400 cc. per minute of air and 100 cc. per minute each of chlorine and hydrogen chloride. There was no powdered aluminum chloride in the top of the glass tube during the five minute treatment with this mixture. There was no noticeable change in the uniform gray color of the catalyst, and a subsequent analysis thereof indicated a platinum content of about 0.076% by weight. The absence of a noticeable change in the color of the catalyst indicated that the treatment with the mixture of hydrogen chloride and chlorine would not effect a change in the apparently inert form of the platinum, such that the latter was converted to a more volatilizable form. The physical state of the activity of the platinum, and the relative range of the concentration thereof within the catalytic composite, is readily indicated by the color of the composite following the removal of coke and carbonaceous material, and following treatment with various reagents.

A 10-gram portion of powdered aluminum chloride was placed at the top of the glass tube, and the temperature resulting from the ceramic-type heaters was raised to a level of 932° F. A stream of nitrogen was passed through the catalyst, carrying volatile aluminum chloride vapors therethrough. Again there was no substantial noticeable change in the color of the catalyst. A chlorinating treatment, employing chlorine and hydrogen chloride, followed by a second treatment with volatile aluminum chloride vapors, did not effect a change in the color of the catalyst. These uniform gray catalyst particles appeared to be impervious to attack, either through oxidation, chlorination or volatile aluminum chloride treatments, or to a combination procedure employing these individual steps. Similarly, the utilization of hydrogen sulfide at a temperature of 932° F., for a period of about 15 minutes, followed by a purge with a stream of nitrogen and a two-hour oxidation treatment in an atmosphere of air, which in turn was followed by a treatment with volatile aluminum chloride vapors, produced no change in the color of the catalyst whereby the removal of the residual, inert platinum would be indicated. An attempt was made to remove the residual platinum from the catalyst by utilizing a mixture of 500 cc. per minute of nitrogen, and carbon monoxide at a rate of 700 cc. per minute. After a treatment of about five minutes duration, with the temperature at a level of about 482° F., there was no noticeable change in the catalyst. The stripping medium was changed to a mixture of 500 cc. per minute of nitrogen, and 700 cc. per minute of chlorine. No additional platinum appeared to be removed from the catalyst during this operation.

The volatilizing gas was changed to a mixture of chlorine at a rate of 700 cc. per minute, hydrogen chloride at a rate of 200 cc. per minute and oxygen at a rate of 700 cc. per minute. After a one hour treatment with this mixture, there was no noticeable change in the color of either the top or the bottom catalyst bed. The temperature of the main 12-inch ceramic heater was increased at 932° F., and the addition of the hydrogen chloride discontinued. The mixture of oxygen and chlorine did not remove any of the residual, inert platinum.

The catalyst beds were treated with a mixture of air, at a rate of 400 cc. per minute, nitric oxide (NO) at a rate of 120 cc. per minute and chlorine at a rate of 100 cc. per minute, at a temperature of 932° F. The appearance of the catalyst changed from the uniform gray to a tan color, indicating thereby a change in the structure of the platinum which remained within the catalyst particles. This change in color was effected within a period of about 5 minutes, during which time the volatilizing mixture consisted of air, nitric oxide and chloride. About 10 grams of powdered aluminum chloride was then placed in the top of the Pyrex glass tube and nitrogen passed therethrough at a rate of 500 cc. per minute and at a temperature imposed by the auxiliary preheater of about 500° F. The catalyst beds, at a temperature of 932° F., immediately changed color to a pure white, indicating the removal of the remaining quantity of platinum. The catalyst beds were removed from the glass tube and analyzed for platinum concentration. The analysis indicated that the catalyst now contained about five parts per million of platinum.

This example clearly illustrates the beneficial effect of an oxide of nitrogen and chlorine in converting the residual, unreacted platinum to a more volatilizable form such that it may be readily removed from the catalyst particles. In addition, the resulting pure white alumina, containing only about 5 parts per million of platinum, is extremely suitable for further utilization as the carrier material in the manufacture of fresh catalyst.

We claim as our invention:

1. A method of removing a noble metal from a composite containing said noble metal which comprises treating said composite with an oxide of nitrogen and a volatilizable inorganic chlorine-containing compound at a temperature sufficient to convert the noble metal to a volatile form.

2. The method of claim 1 further characterized in that said temperature is within the range of about 100° F. to about 1600° F.

3. A method of removing a noble metal from a composite containing said noble metal which comprises treating said composite with an oxide of nitrogen and aluminum chloride at a temperature sufficient to convert the noble metal to a volatile form.

4. A method of removing a noble metal from a composite containing said noble metal which comprises treating said composite with an oxide of nitrogen and chlorine at a temperature sufficient to convert the noble metal to a volatile form.

5. A method for removing platinum from platinum-containing particles which comprises treating said platinum-containing particles with chlorine and an oxide of nitrogen at elevated temperatures sufficient to convert the platinum into a volatile form.

6. A method of removing a noble metal from a composite containing said noble metal which comprises treating said composite with an oxide of nitrogen and aluminum chloride vapors at a temperature of from about 100° F. to about 1600° F. and sufficient to remove the noble metal in vaporized form.

7. In the process of removing a noble metal from a composite containing a noble metal, wherein the composite is treated with a chlorinating reagent to convert the noble metal to a volatile form, the improvement which comprises treating said composite with an oxide of nitrogen at a temperature of from about 100° F. to about 1600° F.

8. A method of recovering platinum from a composite containing the same which comprises treating said composite with an oxide of nitrogen and aluminum chloride vapors at a temperature of from about 100° F. to about 1600° F. and sufficient to remove the platinum in vaporized form, and recovering platinum from the resultant vaporous effluent.

9. A method of recovering platinum from a platinum-alumina composite which comprises treating said composite with an oxide of nitrogen and aluminum chloride vapors at a temperature within the range of from about 700° F. to about 1100° F. and sufficient to remove the platinum in vaporized form, withdrawing vapors after contact with said composite, and recovering platinum from said vapors.

10. The method of claim 9 further characterized in that said oxide of nitrogen comprises $N_2O$.

11. The method of claim 9 further characterized in that said oxide of nitrogen comprises NO.

12. The method of claim 9 further characterized in that said oxide of nitrogen comprises $NO_2$.

13. The method of claim 9 further characterized in that said oxide of nitrogen comprises $N_2O_3$.

14. The method of claim 9 further characterized in that said oxide of nitrogen comprises $N_2O_5$.

References Cited in the file of this patent

UNITED STATES PATENTS

| 137,375 | Lundquist | Apr. 1, 1873 |
| 936,545 | Kitsee | Oct. 12, 1909 |
| 2,635,080 | Appell | Apr. 14, 1953 |

OTHER REFERENCES

Thorpe's Dictionary of Applied Chemistry, vol. VIII, 1947, fourth edition, pp. 562–565.

Smith: Inorganic Chemistry, 3rd ed., 1921, published by the Century Co., New York, pages 536, 537.

Cottrell: Manufacture of Acids and Alkalis, vol. VI, Nitric Acid and Nitrates, D. Van Nostrand Co., 1923, New York, pages 342, 343.